Oct. 28, 1969 H. J. JORDAN ET AL 3,475,221
ELECTRIC STORAGE BATTERY WHICH PROVIDES TWO VOLTAGE SOURCES
Filed Sept. 15, 1966
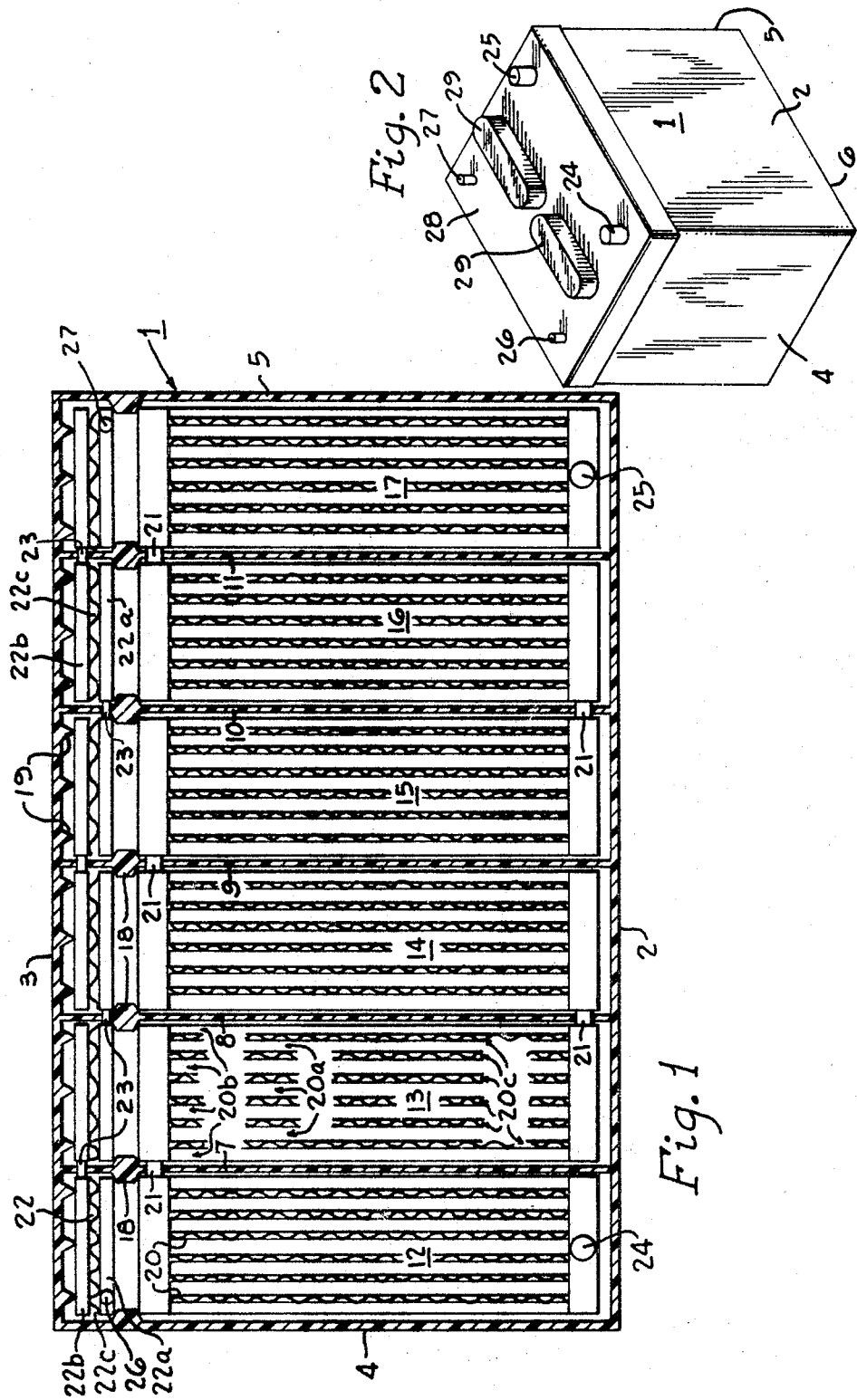

# United States Patent Office 3,475,221
Patented Oct. 28, 1969

3,475,221
ELECTRIC STORAGE BATTERY WHICH PROVIDES TWO VOLTAGE SOURCES
Howard J. Jordan, Brook Park, Ohio, and Louis Zednik, Jr., Orchard Lake, Mich., assignors, by mesne assignments, to ESB Incorporated, Philadelphia, Pa., a corporation of Delaware
Filed Sept. 15, 1966, Ser. No. 579,751
Int. Cl. H01m 35/00
U.S. Cl. 136—6       6 Claims

ABSTRACT OF THE DISCLOSURE

An electric storage battery providing two voltage sources having two rows of elements in a single common container, elements in one row are separated from one another by partitions in the customary manner, while elements from each of the two rows share a cell compartment but are separated by ribs.

---

The present invention relates to a new and improved electric storage battery which provides two voltage sources.

At the present time in automobiles and other motor vehicles there is but one storage battery, and it must provide voltage for both the cranking and ignition to start the motor. While it is desirable to have large voltages for both cranking and ignition, the large current drain caused by cranking results in a greatly reduced voltage available for ignition. Thus the present single battery is not entirely satisfactory.

The obvious solution is to obtain two voltage sources by providing two batteries, one for cranking and one for ignition. This solution, however, is both expensive and space consuming. The cost of two separate batteries is much greater than a single one, explaining why only one is now used. Furthermore, the total space required by two separate batteries which would replace the one presently in us is also greater, one reason being that the servicing of batteries dictates that each battery be of certain minimum size. While the voltage and current requirements for ignition could be met by a very small battery, this battery must necessarily be made larger in size so that it can be serviced when in use.

This invention succeeds in providing separate voltage sources in a storage battery at a minimum of cost and space by placing two rows of elements in a single common container. Elements in one row are separated from one another by partitions in the customary manner, while elements from each of the two rows share a cell compartment but are separated by ribs; elements of the two rows may alternately be separated by divider walls also, with electrolyte passing between the elements by going over the tops of these walls or through openings in the walls in this latter case. The elements in one row may be electrically connected in series to provide voltage for cranking, while the elements in the other row may be similarly connected to provide a voltage source for ignition purposes. The elements in each row may be made to the size required for adequate current, and no greater, and the overall size of the container will be such as to permit proper servicing. Servicing is done as though there were a single row of elements, for since elements of the two rows share electrolyte in pairs, servicing an element in one of the rows simultaneously services an element in the other.

In the following detailed explanation, reference will be made to the drawings in which FIGURE 1 is a plan view of a battery showing the preferred embodiment of the invention, the cover of the battery container being removed; and, FIGURE 2 is a pictorial view of the battery shown in FIGURE 1, but with the cover in place.

As was stated above, a single container 1 houses both rows of elements. For purposes of illustration, it will be assumed that each row produces a total of 12 volts, and so 6 cells producing 2 volts each are shown. The container 1 has side walls 2 and 3, end walls 4 and 5, a bottom 6, and the partitions 7, 8, 9, 10, and 11 as shown in the drawing, and the interior space is divided into cell compartments 12, 13, 14, 15, 16, and 17. (As used in this discussion, a "cell" is a group of positive and negative plates, along with the necessary separators, together with the portion of the cell compartment in which the plates and separators are housed.) Each of these cell compartments is shown having divider ribs 18 extending outwardly from the partions near one end of the compartment, and in addition has spacing ribs 19 projecting inwardly toward the compartment from the side wall 3 nearest the divider ribs 18 as shown. The drawing shows the divider ribs 18 dividing the cell compartments into portions of unequal size to illustrate the preferred embodiment of the invention, although the invention should not be regarded as being limited to such a construction.

In each of the cell compartments 12 through 17 conventional battery elements may be placed, elements 20 (single cell groups of positive plates 20a and negative plates 20b alternately spaced and separated from one another by separators 20c) being placed in the larger portions of the cell compartments and electrically connected in series in any conventional manner by connectors 21. Other elements 22 (constructed in the manner of elements 20; for simplicity, the drawing shows each element 22 containing only one positive plate 22a, one negative plate 22b, and one separator 22c, although of course more plates and separators may be used) are placed in the smaller portions of the cell compartments and also connected in series by connectors 23. The divider ribs 18 prevent the elements 20 and 22 from coming into contact with one another.

Elements 20, when connected together in series, comprise the first row and provide the first voltage source with terminals 24 and 25, while elements 22 likewise comprise the second row and voltage source with terminals 26 and 27. Each element 20 shares electrolyte with an element 22 situated in the same cell compartment with it.

In the battery shown for illustrative purposes in the drawing, the lead-acid reaction will produce a voltage of approximately 2 volts in each element in each cell compartment. The elements 20, which produce a total of 12 volts and which might be used for cranking, produce large currents due to the large surface areas exposed to electrolyte, while the other elements 22, producing the same voltage but much less current, might be used for ignition. It will be apparent that the power outputs under load of the two rows of elements are variable and independent of one another, and can be changed simply by changing the number and/or the size of plates in the elements. The basic open circuit voltages may be varied by changing the number of cells.

In the drawing the elements 22 are shown extending in a direction perpendicular to that of the elements 20. The elements in the two rows could be parallel as well. The arrangement of elements 20 and 22 shown minimizes the short dimension of the container 1, and it is for this purpose that the elements 20 and 22 are positioned as shown. The relative positioning of the two rows of elements is based solely on current, voltage, and volume economy considerations.

The saving in space achieved by use of this invention rather than by use of the two separately housed batteries will be appreciated when it is realized that a first battery for cranking would be the same length as the container 1 shown, and would have a width approximately the distance from side wall 2 to divider ribs 18. A second separate battery for ignition purposes would require much more space than that extending between the end walls 4 and 5 and between ribs 18 and side wall 3 of the container 1 shown in the drawings.

An additional advantage which may result from supplying a higher ignition voltage than is presently provided is a reduction in cost of some of the other components in the ignition system. At the present time the low voltage supplied for ignition requires comparatively expensive components.

Elements 20 and 22 are shown separated by divider ribs 18. This result could be achieved equally well be extending divider walls across the cells in place of the ribs 18, and providing one or more openings in the walls so that the electrolyte level in the two portions of each cell will always be the same. This divider wall might also be without openings, but have its top sufficiently low so that electrolyte will at all times be shared by the two portions of the cell compartments.

The drawings do not show the many details of construction which are not relevant to the invention. The cover 28 for container 1 could be of any standard design and is not important to the understanding of the invention. The details of joining plates and separators to form elements, and of connecting elements in series, are not shown because these may be ones now in conventional use. Likewise the details of how terminal posts extend out through the cover of the container are omitted. Conventional vent plugs 29 may be used in the cover, and since a common electrolyte is shared by the two portions of each cell compartment, a single vent will suffice for each cell compartment, with consequent economies, compactness, and improved serviceability.

Also, while for illustrative purposes discussion has centered about an automotive battery in which lead and sulphuric acid are used, the invention is not limited to these, for any materials which produce a voltage when combined may be used as well.

Having described our invention so that those familiar with the art may understand it, what we claim is the following:

1. An electric storage battery which provides two voltage sources comprising:
   (a) a container;
   (b) partitions in the container dividing the space inside the container into cell compartments;
   (c) dividing means in each cell compartment which divide each compartment into a first portion and second portion, the dividing means permitting electrolyte to pass between portions of the compartment;
   (d) first elements in the first portions of the cell compartments, the first elements being electrically connected in series; and,
   (e) second elements in the second portions of the cell compartments, the second elements being electrically connected in series.

2. The electric storage battery of claim 1 wherein the dividing means constitutes divider ribs extending outwardly from the partitions.

3. The electric storage battery of claim 1 wherein the dividing means constitutes a divider wall extending from partition to partition across the cell compartment.

4. The electric storage battery of claim 1 wherein the dividing means constitutes a divider wall extending from partition to partition across the cell compartment and having an opening therein.

5. The electric storage battery of claim 1 wherein the first elements are positioned perpendicularly with respect to the second elements.

6. The electric storage battery of claim 1 wherein the first elements are positioned parallel with respect to the second elements.

References Cited

UNITED STATES PATENTS

Re. 25,054    10/1961    Rigsby.
3,200,014    8/1965    Roberts.

WINSTON A. DOUGLAS, Primary Examiner

A. SKAPARS, Assistant Examiner

UNITED STATES PATENT OFFICE
CERTIFICATE OF CORRECTION

Patent No. 3,475,221            October 28, 1969

Howard J. Jordan et al.

It is certified that error appears in the above identified patent and that said Letters Patent are hereby corrected as shown below:

In the heading to the printed specification, lines 5 to 7, "assignors, by mesne assignments, to ESB Incorporated, Philadelphi Pa., a corporation of Delaware" should read -- assignors, by direc and mesne assignments, to ESB Incorporated, Philadelphia, Pa., a corporation of Delaware and Chrysler Corporation, a corporation of Delaware --.

Signed and sealed this 20th day of October 1970.

(SEAL)
Attest:

Edward M. Fletcher, Jr.
Attesting Officer

WILLIAM E. SCHUYLER, JR.
Commissioner of Patents